United States Patent
Gupta et al.

(10) Patent No.: US 9,321,687 B2
(45) Date of Patent: Apr. 26, 2016

(54) LOW CONCENTRATION ALKALI FLY ASH CEMENT AND METHOD OF MAKING

(71) Applicant: University of North Dakota, Grand Forks, ND (US)

(72) Inventors: Surojit Gupta, Grand Forks, ND (US); M. Faisal Riyad, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 222 days.

(21) Appl. No.: 13/935,078

(22) Filed: Jul. 3, 2013

(65) Prior Publication Data

US 2015/0007751 A1    Jan. 8, 2015

(51) Int. Cl.
  *C04B 18/06* (2006.01)
  *C04B 18/08* (2006.01)
  *C04B 28/02* (2006.01)

(52) U.S. Cl.
  CPC .............. *C04B 28/021* (2013.01); *C04B 28/02* (2013.01)

(58) Field of Classification Search
  CPC ................................ C04B 18/06; C04B 18/08
  See application file for complete search history.

(56) References Cited

U.S. PATENT DOCUMENTS

| | | | |
|---|---|---|---|
| 4,715,896 A * | 12/1987 | Berry | 106/707 |
| 5,435,843 A * | 7/1995 | Roy et al. | 106/705 |
| 5,704,972 A * | 1/1998 | Ivkovich | 106/710 |
| 6,645,290 B1 * | 11/2003 | Barbour | 106/705 |
| 2003/0106466 A1 * | 6/2003 | Barbour | 106/734 |
| 2004/0050303 A1 * | 3/2004 | Barbour | 106/815 |
| 2009/0013907 A1 * | 1/2009 | Boxley et al. | 106/705 |
| 2009/0071379 A1 * | 3/2009 | Boxley | 106/705 |
| 2012/0152153 A1 * | 6/2012 | Gong et al. | 106/705 |
| 2012/0156381 A1 * | 6/2012 | Allouche et al. | 427/377 |
| 2012/0172469 A1 * | 7/2012 | Perez-Pena | 521/83 |
| 2013/0263758 A1 * | 10/2013 | Skoda et al. | 106/286.3 |

OTHER PUBLICATIONS

Xiaolu Guo, Huisheng Shi, Liming Chen, Warren A. Dick, Alkali-activated complex binders from class C fly ash and Ca-containing admixtures, Journal of Hazardous Materials 173 (2010) 480-486.

Xiaolu Guo, Huisheng Shi, Warren A. Dick, Compressive strength and microstructural characteristics of class C fly ash geopolymer, Cement & Concrete Composites 32 (2010) 142-147.

Jae Eun Oh, Juhyuk Moon, Sand-Gyun Oh, Simon M. Clark, Paulo J.M. Monteiro, Microstructural and compositional change of NaOH-activated high calcium fly ash by incorporating Na-aluminate and co-existence of geopolymeric gel and C-S-H(1).

* cited by examiner

*Primary Examiner* — Paul Marcantoni
(74) *Attorney, Agent, or Firm* — Kinney & Lange, P.A.

(57) ABSTRACT

A method for making a low-alkali fly ash cement includes forming a mixture of class C fly ash and an aqueous solution and forming low-alkali fly ash cement from the mixture. The aqueous solution has an alkali at a molar concentration between about 0.002 M and about 2 M. A low-alkali fly ash cement includes class C fly ash and an alkali activating agent. The low-alkali fly ash cement contains between about $3 \times 10^{-4}$ wt % alkali activating agent and about 2 wt % alkali activating agent. A method for making fly ash cement includes forming a mixture of class C fly ash and water, wet pressing the mixture and forming fly ash cement from the mixture by curing the mixture at a temperature between about 60° C. and about 90° C.

20 Claims, 4 Drawing Sheets

LOW CONCENTRATION ALKALI FLY ASH CEMENT AND METHOD OF MAKING

BACKGROUND

Fly ash is one of the residues generated as coal is combusted. Fly ash is the particulate matter that rises with the flue gases leaving the combustion chamber. In the past, fly ash was typically released into the atmosphere. Now, however, fly ash has been recognized as an environmental pollutant and is generally captured using electrostatic precipitators or other filtration equipment. In the United States, fly ash is generally stored at coal power plants or placed in a landfill. Two classes of fly ash are categorized according to ASTM C618: Class C fly ash and Class F fly ash. The primary difference between the classes is the amount of calcium, silica, alumina, and iron content in the fly ash, which are largely determined by the chemical content of the coal burned. The burning of hard, old anthracite and bituminous coal typically produces Class F fly ash. Class C fly ash is produced from the burning of young lignite or subbituminous coal.

Fly ash has been used as a component in cement and supplemental cement materials. Most of the research to date has been conducted using Class F fly ash. In order to form cement materials using Class F fly ash, large amounts of an alkali "activator" (e.g., NaOH) are typically required. An aqueous solution of an alkali activator (e.g., >4.5 M NaOH) is mixed with the fly ash. The use of large amounts of alkali activators raises concerns, however. First, alkali activators are electrochemically generated by the chloralkali process, which produces with harmful $Cl_2$ or HCl gas by-products. Second, the presence of free alkali can have deleterious effects on activated fly ash cement. Third, the production of large amounts of alkali is an energy intensive process and can indirectly lead to increased toxic $CO_2$ emissions.

SUMMARY

A method for making a low-alkali fly ash cement includes forming a mixture of class C fly ash and an aqueous solution and forming low-alkali fly ash cement from the mixture. The aqueous solution has an alkali at a molar concentration between about 0.002 M and about 2 M.

A low-alkali fly ash cement includes class C fly ash and an alkali activating agent. The low-alkali fly ash cement contains between about $3 \times 10^{-4}$ wt % alkali activating agent and about 2 wt % alkali activating agent.

A method for making fly ash cement includes forming a mixture of class C fly ash and water, wet pressing the mixture and forming fly ash cement from the mixture by curing the mixture at a temperature between about 60° C. and about 90° C.

DETAILED DESCRIPTION

Figure 1:
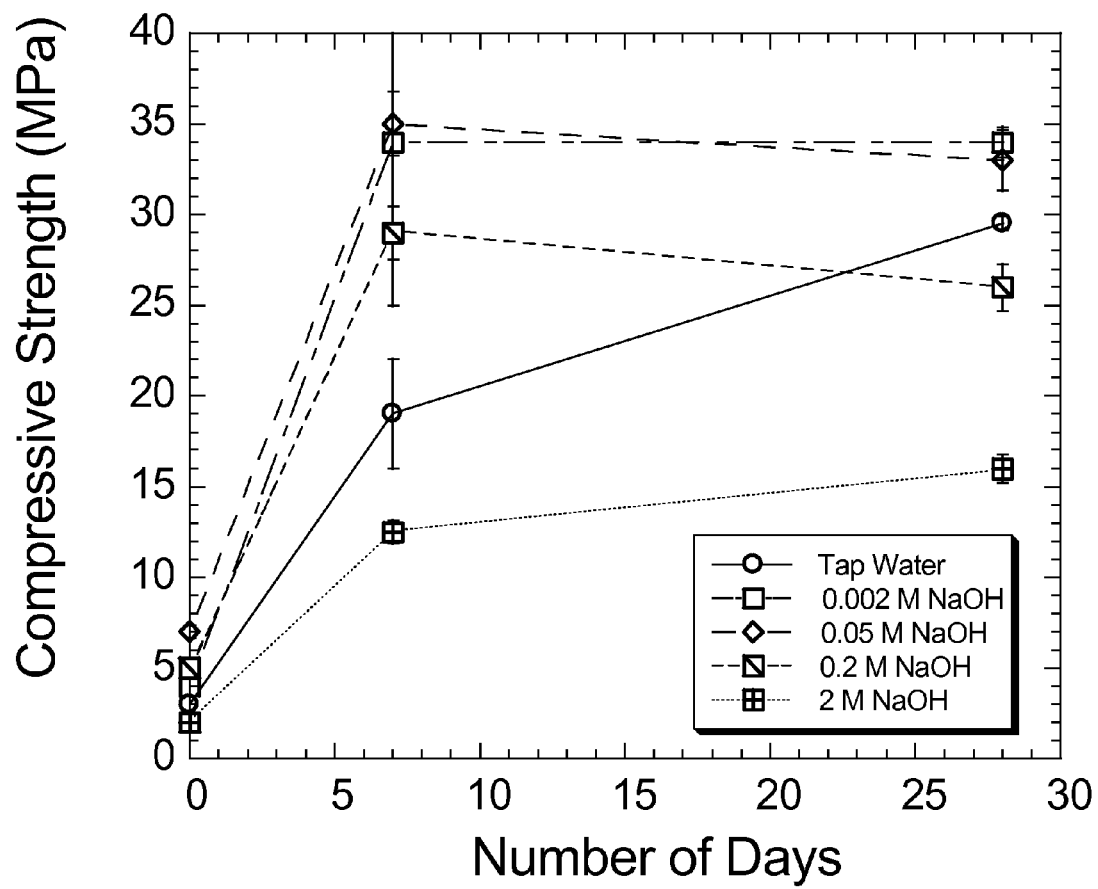
FIG. 1 is a graph illustrating the compressive strengths of embodiments of low-alkali fly ash cement.

According to the present invention, Class C fly ash is activated using relatively small amounts of alkali to form a low-alkali fly ash cement (LAFAC). The low-alkali fly ash cement described herein possesses greater compressive strength than non-alkali fly ash cements (prepared using only water) and high-alkali fly ash cements, while lacking the disadvantages associated with high levels of alkali. Low-alkali fly ash cement according to the present invention is formed by mixing Class C fly ash with an aqueous solution of an alkali. The molar concentration of the alkali in the aqueous solution is between about 0.002 M and about 2 M. Additionally, fly ash cements can be improved without the addition of even small amounts of alkali. According to the present invention, a mixture of Class C fly ash and water that is pressed and then cured at a relatively high temperature possesses improved mechanical properties after curing for 24 hours.

All grades of fly ash contain appreciable amounts of silicon dioxide ($SiO_2$) and calcium oxide (CaO). Class F fly ash is pozzolanic in nature, and contains less than 20% CaO. Having pozzolanic properties, Class F fly ash requires a cementing agent, such as Portland cement, quicklime, or hydrated lime, with the presence of water in order to react and produce cementitious compounds. Alternatively, the addition of a chemical activator such as sodium silicate (water glass) to Class F fly ash can lead to the formation of a geopolymer.

Compared to Class F fly ash, Class C fly ash generally contains lower amounts of $SiO_2$ and greater amounts of CaO. Class C fly ash generally contains lower amounts of both $SiO_2$ and CaO than Portland cement, a common hydraulic cement. Class C fly ash has some self-cementing properties. In the presence of water, Class C fly ash will harden and gain strength over time. Class C fly ash generally contains at least 20% CaO. Unlike Class F, self-cementing Class C fly ash does not require an activator. However, as described herein, the addition of small amounts of alkali to Class C fly ash yields improved cement materials. An alkali is a base or ionic salt of an alkali metal or alkaline earth metal element. Examples of alkali include, but are not limited to, sodium hydroxide (NaOH), sodium carbonate ($Na_2CO_3$), sodium chloride (NaCl) and calcium hydroxide ($Ca(OH)_2$).

Low-alkali fly ash cement is formed by mixing Class C fly ash with an aqueous solution containing an alkali ("alkaline solution") and forming a cement with the mixture. The alkali metal and/or alkaline earth metal ions present in the alkaline solution strengthen the low-alkali fly ash cement by "activating" the fly ash and enhancing geopolymerization and/or hydration reactions. According to the present invention, the alkaline solution contains alkali at a molar concentration between about 0.002 M and about 2 M. Suitable alkali for use in the alkaline solution include hydroxides, including but not limited to, NaOH, KOH, $Ca(OH)_2$, and $Mg(OH)_2$; carbonates, including but not limited to, $Na_2CO_3$; bicarbonates, including but not limited to $NaHCO_3$; water-soluble silicates, including but not limited to $NaSiO_3$; chlorides, including but not limited to NaCl, $CaCl_2$, $MgCl_2$; sulfates, including but not limited to $Na_2SO_4$ and combinations thereof. In one particular embodiment, the alkali is NaOH. In another particular embodiment, the alkali is $Na_2CO_3$. In another particular embodiment, the alkali is $Ca(OH)_2$. In another particular embodiment, the alkali is a combination of $Na_2CO_3$ and $Ca(OH)_2$. In another particular embodiment, the alkali is a combination of NaOH and Ca(OH)$_2$. While Ca(OH)$_2$ is only sparingly soluble in water (1.5 g per L), solubilized Ca(OH)$_2$ (limewater) can be used as the alkaline solution.

The alkaline solution contains alkali at a molar concentration between about 0.002 M and about 2 M. This concentration range is for the total amount of alkali when two or more alkali metal or alkaline earth metal salts are present in the alkaline solution. In some embodiments, the molar concentration of the alkali in the alkaline solution is between about 0.04 M and about 0.2 M. In other embodiments, the molar concentration of the alkali in the alkaline solution is between about 0.04 M and about 0.1 M.

In still another embodiment, waste materials containing alkali, such as lime kiln dust, can provide alkali content either to the alkaline solution or to the overall mixture containing fly ash and the alkaline solution. Lime kilns are used to produce quicklime (CaO) through the calcination of limestone (calcium carbonate, CaCO$_3$). Quicklime is produced according to the reaction:

$$CaCO_3 + heat \rightarrow CaO + CO_2$$

Lime kiln dust includes very fine particles that are a mixture of dust from the ground limestone added to the kiln and fly ash formed by the burning of the fuel used to heat the kiln. Lime kiln dust usually includes alkali metals, halogens and sulfur and is highly corrosive. As a result, lime kiln dust is generally trapped using electrostatic precipitators or other filtration techniques. When Class C fly ash is mixed with an alkaline solution containing lime kiln dust, the low-alkali fly ash cement formed contains not one, but two waste materials (both fly ash and lime kiln dust). Other waste materials containing alkali include cement kiln dust (formed during the pyroprocessing stage of Portland and other hydraulic cements) and red mud (a solid waste product of the Bayer process used for refining bauxite into alumina). Lime kiln dust and cement kiln dust generally contain appreciable quantities of CaO and/or Ca(OH)$_2$. Red mud generally contains appreciable quantities of iron oxide, metals and NaOH. In some embodiments, low-alkali fly ash cement contains insoluble Ca(OH)$_2$ in addition to the alkali present in the alkaline solution. In some of these embodiments, the insoluble Ca(OH)$_2$ comes from waste materials such as lime kiln dust and/or cement kiln dust. Alternatively, alkaline solutions containing the aforementioned waste materials can also be prepared.

Low-alkali fly ash cement is formed from the mixture of the Class C fly ash and the alkaline solution. In one embodiment, low-alkali fly ash cement is formed by casting and curing the mixture. In another embodiment, the low-alkali fly ash cement is formed by compressing the mixture. When the mixture is wet pressed to form low-alkali fly ash cement, a compression force between about 17 MPa and about 120 MPa is used. In some embodiments, the mixture is wet pressed by a force between about 17 MPa and about 50 MPa. No heating is required during compression (wet pressing) of the mixture; the mixture can be wet pressed at a range of ambient temperatures (approximately 10° C. to 40° C.). However, Applicants found that a mixture of Class C fly ash and water that is wet pressed and then cured at temperatures between about 60° C. and about 90° C. showed strengthening following 24 hours of curing when compared to conventional cement-based materials, which take up to 28 days to cure under ambient conditions (approximately 10° C. to 40° C.).

In some embodiments, an aggregate material is added to the mixture. Aggregate materials include, but are not limited to, sand, coarse gravel, crushed limestone and granite, and waste materials such as recycled concrete, recycled rubber, recycled plastics. One or more aggregate materials can be mixed with the fly ash prior to addition of the alkaline solution. Suitable aggregate materials for use in low-alkali fly ash cement include sand, limestone, crushed stone, recycled concrete, recycled rubber, recycled plastics and combinations thereof.

At the time the low-alkali fly ash cement is cast or wet pressed, the fly ash/alkaline solution mixture contains solids and liquid. In embodiments of the present invention, the mixture generally contains between about 10% and about 25% liquid by weight. In embodiments in which the mixture is wet pressed, some of the liquid escapes. In these embodiments, the wet pressed mixture contains between about 8% and about 20% liquid by weight. In embodiments where the mixture contains an aggregate material, the mixture generally contains between about 5% and about 30% liquid by weight. Cements made with fly ash according to the prior art typically contain about 40% liquid by weight prior to casting.

Low-alkali fly ash cement according to the present invention contains a low amount of alkali compared to Class F fly ash cements. The low-alkali fly ash cement generally contains between about $3 \times 10^{-4}$ wt % alkali activating agent and about 2 wt % alkali activating agent. In some embodiments, the low-alkali fly ash cement generally contains between about 0.01 wt % alkali activating agent and about 0.05 wt % alkali activating agent. In other embodiments, the low-alkali fly ash cement generally contains between about 0.01 wt % alkali activating agent and about 0.02 wt % alkali activating agent.

Example 1

Eighteen grams of fly ash (Class C, obtained from Headwaters Resources, South Jordan, Utah) was mixed with 3 grams of activating solution (NaOH and Na$_2$CO$_3$ obtained from Sigma Aldrich, St. Louis, Mo.) and mixed for one minute in a ball mill (8000 M Mixer Mill, obtained from SPEX Certiprep, Metuchen, N.J.). The mixtures where then wet pressed in a laboratory press (Carver Laboratory Press, obtained from Carver Inc., Wabash, Ind.) at a force of about 87 MPa for 30 seconds (twice per sample) to prepare sample preforms. The sample preforms where allowed to cure in a closed box under ambient (room temperature) conditions. After 7 and 28 days, the compressive strength of the cured preforms was tested. Table 1 lists the activating solutions used. Tap water was used to prepare all solutions. A control sample of water only (no alkali) was also prepared and tested as described above.

TABLE 1

| Concentration (M) | Alkali |
|---|---|
| 0.002 | NaOH |
| 0.05 | NaOH |
| 0.2 | NaOH |
| 2 | NaOH |
| 0.002 | Na$_2$CO$_3$ |
| 0.05 | Na$_2$CO$_3$ |
| 0.2 | Na$_2$CO$_3$ |
| 2 | Na$_2$CO$_3$ |

Figure 2:
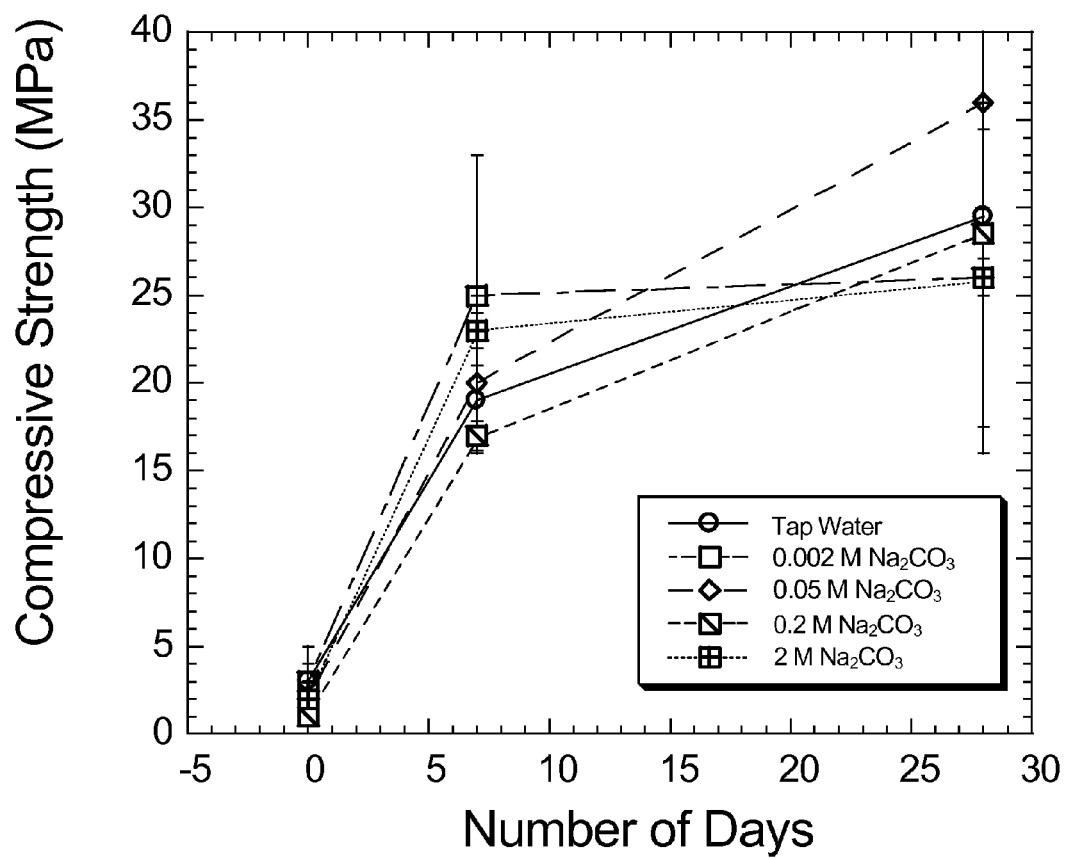
FIG. 2 is a graph illustrating the compressive strengths of additional embodiments of low-alkali fly ash cement.

FIG. 1 illustrates the compressive strength testing results of the sample preforms containing NaOH, and FIG. 2 illustrates the compressive strength testing results of the sample preforms containing Na$_2$CO$_3$. The results show that (1) the control samples (water only) showed pozzolanic activity; (2) samples activated with low amounts of alkali showed faster strength enhancement when compared to the control sample;

and (3) solutions of NaOH showed increased reaction kinetics when compared to solution of $Na_2CO_3$. The latter result suggests that the reaction kinetics of low-alkali fly ash cement can be better controlled using $Na_2CO_3$ as the alkali. The compressive strength testing results also showed that the 2 M NaOH and 2 M $Na_2CO_3$ solutions yielded a preform sample that had less strength than the wet pressed control sample.

Example 2

Figure 3A:
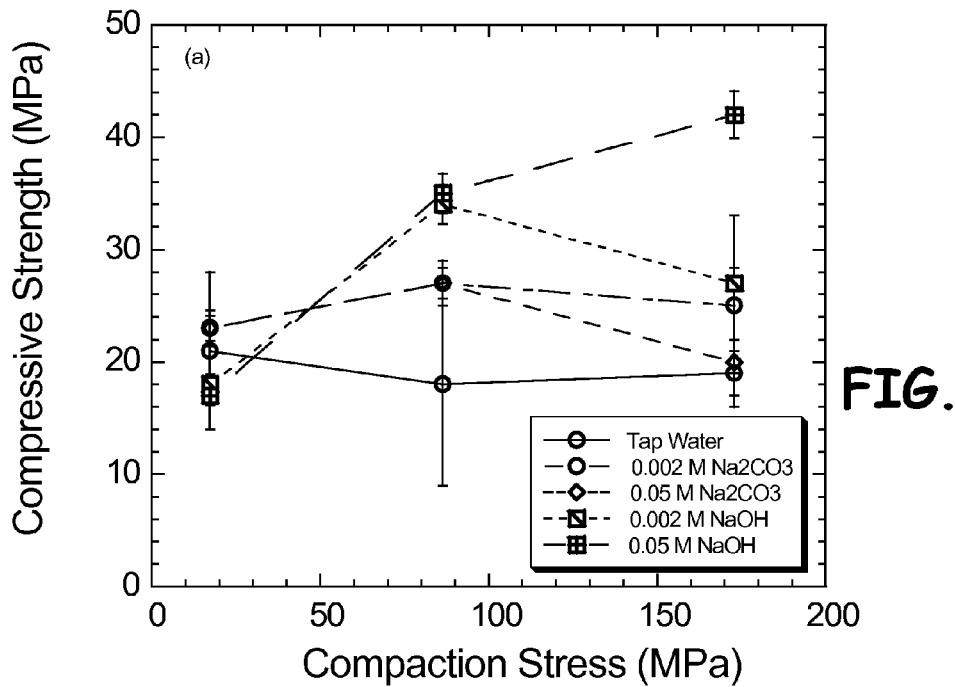
FIG. 3A is a graph illustrating the compressive strengths of embodiments of low-alkali fly ash cement initially wet pressed under different amounts of force after 7 days.
Figure 3B:
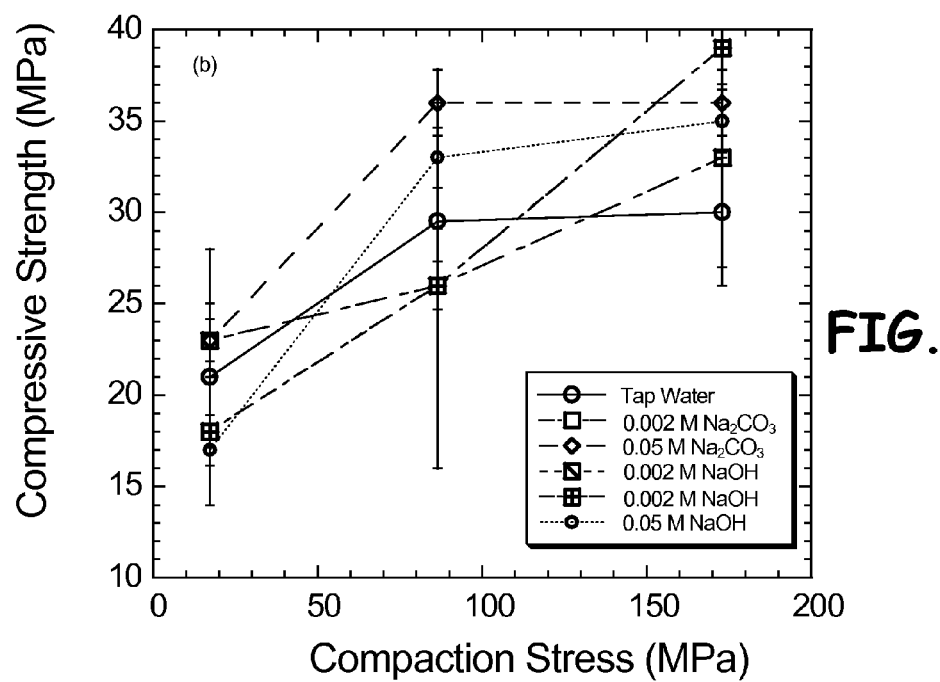
FIG. 3B is a graph illustrating the compressive strengths of embodiments of low-alkali fly ash cement initially wet pressed under different amounts of force after 28 days.

Class C Fly ash and activating solutions were mixed according to the directions above. The activating solutions tested were 0.002 M and 0.05 M NaOH and 0.002 M and 0.05 M $Na_2CO_3$, in addition to a control sample (water only). Sample preforms were prepared for each fly ash/activating solution mixture by compressing the samples using forces ranging from about 17 MPa to about 170 MPa (shown along the x-axis in FIGS. 3A and 3B). The sample preforms where allowed to cure in a closed box under ambient (room temperature) conditions for 7 days. The compressive strength of the cured preforms was then tested. FIG. 3A illustrates the compressive strength testing results of the sample preforms (y-axis) after 7 days. The results show that low-alkali fly ash cement preforms can be prepared at low pressure (about 17 MPa) without compromising their mechanical strength. FIG. 3B illustrates the compressive strength testing results of the sample preforms after 28 days. Initial compression of the performs at higher pressures showed enhanced strengthening for low-alkali activated samples.

Example 3

Twenty grams of Class C fly ash was mixed with 20 grams of sand (obtained from Sigma Aldrich, St. Louis, Mo.) and 4 grams of activating solution and mixed for one minute in a ball mill. The mixtures where then pressed in a laboratory press at a force of about 87 MPa for 30 seconds (twice per sample) to prepare sample preforms. The sample preforms where allowed to cure in a closed box under ambient (room temperature) conditions. After 7 and 28 days, the compressive strength of the cured preforms was tested. Table 2 lists the activating solutions used. A control sample of water only (no alkali) was also prepared and tested as described above.

TABLE 2

| Concentration (M) | Alkali |
| --- | --- |
| 0.002 | NaOH |
| 0.05 | NaOH |
| 0.002 | $Na_2CO_3$ |
| 0.05 | $Na_2CO_3$ |

Figure 4:
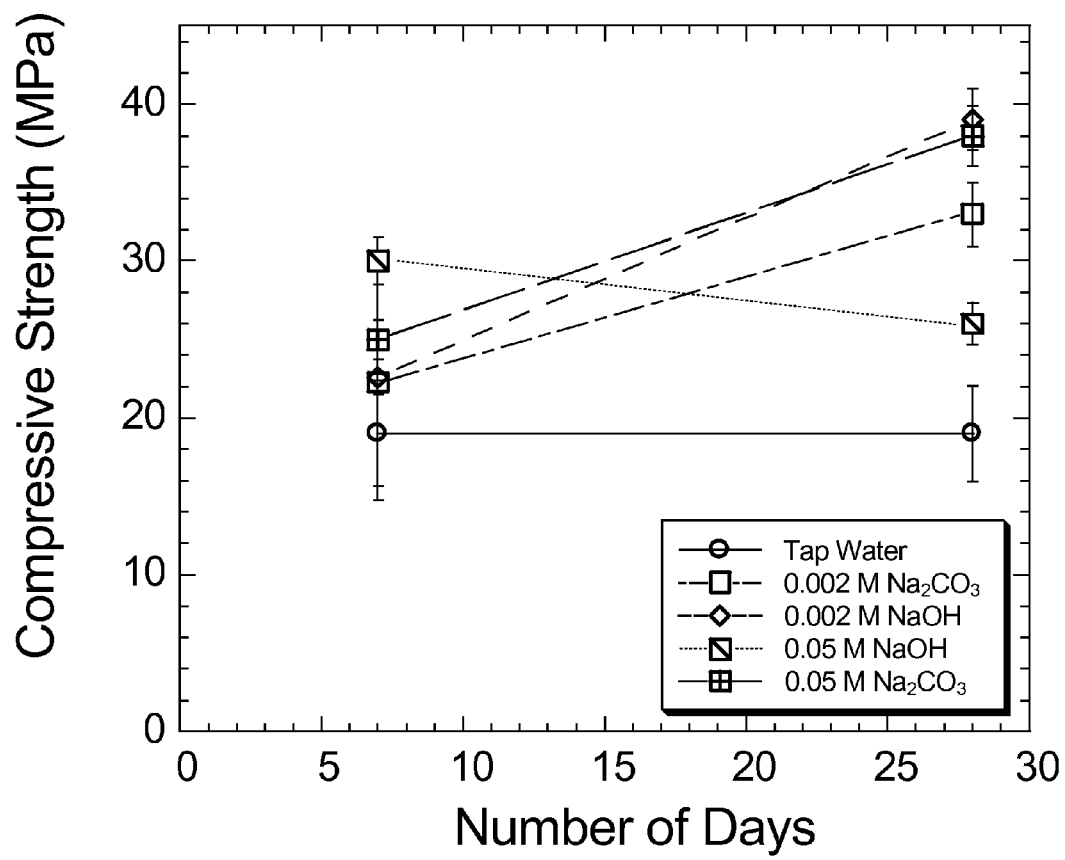
FIG. 4 is a graph illustrating the compressive strengths of embodiments of low-alkali fly ash cement formed with aggregate material.

FIG. 4 illustrates the compressive strength testing results of the sample preforms. The results show that (1) the samples activated with low amounts of alkali showed strength enhancement when compared to the control sample and (2) the compressive strength of the sample preforms increased over time. Overall, the results demonstrate that small amounts of alkali provide Class C fly ash cement having improved strength when compared to control samples.

Example 4

14.4 grams of Class C fly ash was mixed with 3.6 grams of $Ca(OH)_2$ (obtained from Sigma Aldrich) and 3 grams of activating solution (0.05 M NaOH or 0.05 M $Na_2CO_3$) and mixed for one minute in a ball mill. The mixtures where then pressed in a laboratory press at a force of about 87 MPa for 30 seconds (twice per sample) to prepare sample preforms. The sample preforms where allowed to cure in a closed box under ambient (room temperature) conditions. After 7 and 28 days, the compressive strength of the cured preforms was tested. A control sample, in which the activating solution was replaced with water, was also prepared and tested as described above. Table 3 summarizes the research results. The addition of $Ca(OH)_2$ enhanced the strength of the control preform to 51±2 MPa after curing for 28 days, whereas similar strength was obtained after 7 days with the further addition of either 0.05 M NaOH or $Na_2CO_3$.

TABLE 3

| Class C Fly Ash (g) | $Ca(OH)_2$ (g) | Activating Solution | Curing Time (days) | Compressive Strength (MPa) |
| --- | --- | --- | --- | --- |
| 18 | — | Water | 28 | 29.5 ± 0.43 |
| 14.4 | 3.6 | Water | 28 | 51 ± 2 |
| 14.4 | 3.6 | 0.05M NaOH | 7 | 51 ± 6 |
| 14.4 | 3.6 | 0.05M $Na_2CO_3$ | 7 | 45 ± 10 |

Example 5

Eighteen grams of Class C fly ash was mixed with 3 grams of activating solution (0.05 M NaOH or 0.05 M $Na_2CO_3$) and mixed for one minute in a ball mill. The mixtures where then pressed in a laboratory press at a force of about 87 MPa for 30 seconds (twice per sample) to prepare sample preforms. The sample preforms where allowed to cure in a closed container at 70° C. for 24 hours in a muffle furnace. A sample in which the activating solution was replaced with water was also prepared and tested as described above. Table 4 illustrates the effect of high temperature curing of Class C fly ash samples. All the samples showed an increase in compressive strength after high temperature curing for 24 hours.

TABLE 4

| Class C Fly Ash (g) | Solution | Curing Time/ Temperature | Compressive Strength (MPa) |
| --- | --- | --- | --- |
| 18 | Water | 28 days/Room temperature | 29.5 ± 0.4 |
| 18 | 0.05M NaOH | 28 days/Room temperature | 33 ± 6 |
| 18 | 0.05M $Na_2CO_3$ | 28 days/Room temperature | 36 ± 11 |
| 18 | Water | 24 hours/70° C. | 28.5 ± 2 |
| 18 | 0.05M NaOH | 24 hours/70° C. | 31.5 ± 5 |
| 18 | 0.05M $Na_2CO_3$ | 24 hours/70° C. | 29 ± 1 |

Example 6

Twenty grams of Class C fly ash was mixed with 20 grams of sand and 4 grams of activating solution and mixed for one minute in a ball mill. The mixtures where then pressed in a laboratory press at a force of about 87 MPa for 30 seconds (twice per sample) to prepare sample preforms. The sample preforms where allowed to cure in a closed box at 70° C. for 24 hours. The compressive strength of the cured preforms was tested. Table 5 illustrates the effect of high temperature curing of Class C fly ash samples. All the samples showed an increase in compressive strength after high temperature curing for 24 hours. This study shows that class C fly ash based samples can be activated at high temperatures even without the presence of low levels of alkali.

TABLE 5

| Class C Fly Ash (g) | Sand (g) | Solution | Curing Time/ Temperature | Compressive Strength (MPa) |
|---|---|---|---|---|
| 20 | 20 | Water | 28 days/Room temperature | 19 ± 3 |
| 20 | 20 | 0.05M NaOH | 28 days/Room temperature | 26 ± 12 |
| 20 | 20 | 0.05M $Na_2CO_3$ | 28 days/Room temperature | 38 ± 11 |
| 20 | 20 | Water | 24 hours/70° C. | 37 ± 9 |
| 20 | 20 | 0.05M NaOH | 24 hours/70° C. | 27 ± 7 |
| 20 | 20 | 0.05M $Na_2CO_3$ | 24 hours/70° C. | 28 ± 10 |

Example 7

14.4 grams of Class C fly ash was mixed with 3.6 grams of lime kiln dust (LKD) (obtained from Gilmour and Company, Salt Lake City, Utah) and 3 grams of water or activating solution (0.05 M NaOH or 0.05 M $Na_2CO_3$) and mixed for one minute in a ball mill. The mixtures where then pressed in a laboratory press at a force of about 87 MPa for 30 seconds (twice per sample) to prepare sample preforms. The sample preforms where allowed to cure in a closed box under ambient (room temperature) conditions. After 7 days, the compressive strength of the cured preforms was tested. Table 6 summarizes the research results. The compressive strength of Class C fly ash samples cured in water for 7 days was 19±3 MPa. The addition of LKD enhanced the strength of the control preform to 32±8 MPa after curing for 7 days, whereas slightly better or similar strength was obtained after 7 days by further addition of either 0.05 M NaOH or 0.05 M $Na_2CO_3$.

TABLE 6

| Class C Fly Ash (g) | LKD (g) | Solution | Curing time (days) | Compressive Strength (MPa) |
|---|---|---|---|---|
| 18 | — | Water | 7 | 19 ± 3 |
| 14.4 | 3.6 | Water | 7 | 32 ± 8 |
| 14.4 | 3.6 | 0.05M NaOH | 7 | 35 ± 4 |
| 14.4 | 3.6 | 0.05M $Na_2CO_3$ | 7 | 32 ± 6 |

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A method for making a low concentration alkali fly ash cement, the method comprising:
   forming a mixture of class C fly ash and an aqueous solution, wherein the aqueous solution comprises an alkali at a molar concentration between about 0.002 M and about 0.2 M; and
   forming low concentration alkali fly ash cement from the mixture.

2. The method of claim 1, wherein the alkali is selected from the group consisting of hydroxides, carbonates, bicarbonates, silicates, chlorides, sulfates and combinations thereof.

3. The method of claim 2, wherein the alkali is selected from the group consisting of NaOH, KOH, $Ca(OH)_2$, $Mg(OH)_2$, $Na_2CO_3$, $NaHCO_3$, $NaSiO_3$, NaCl, $CaCl_2$, $MgCl_2$, $Na_2SO_4$ and combinations thereof.

4. The method of claim 3, wherein the alkali is sodium hydroxide.

5. The method of claim 3, wherein the alkali is sodium carbonate.

6. The method of claim 3, wherein the alkali is calcium hydroxide.

7. The method of claim 6, wherein the aqueous solution comprises a waste material selected from the group consisting of lime kiln dust, cement kiln dust, red mud and combinations thereof.

8. The method of claim 3, wherein the mixture further comprises insoluble calcium hydroxide.

9. The method of claim 8, wherein the mixture comprises a waste material selected from the group consisting of lime kiln dust, cement kiln dust, red mud and combinations thereof.

10. The method of claim 1, wherein the aqueous solution comprises an alkali at a molar concentration between about 0.04 M and about 0.2 M.

11. The method of claim 10, wherein the aqueous solution comprises an alkali at a molar concentration between about 0.04 M and about 0.1 M.

12. The method of claim 1, wherein the low concentration alkali fly ash cement is formed by casting and curing the mixture of class C fly ash and the aqueous solution.

13. The method of claim 1, wherein the low concentration alkali fly ash cement is formed by compressing the mixture of class C fly ash and the aqueous solution.

14. The method of claim 13, wherein the mixture is wet pressed under a force between about 17 MPa and about 120 MPa.

15. The method of claim 14, wherein the mixture is wet pressed under a force between about 17 MPa and about 87 MPa.

16. The method of claim 1, wherein the mixture contains between about 10% and about 25% liquid by weight.

17. The method of claim 1, wherein the mixture further comprises an aggregate material.

18. The method of claim 17, wherein the aggregate material is selected from the group consisting of sand, limestone, crushed stone, recycled concrete, recycled rubber, recycled plastics and combinations thereof.

19. The method of claim 17, wherein the mixture contains between about 5% and about 30% liquid by weight.

20. The method of claim 1, wherein forming the low concentration alkali fly ash cement comprises:
   wet pressing the mixture; and
   curing the mixture at a temperature between about 60° C. and about 90° C.

* * * * *